United States Patent [19]

Alvino et al.

[11] Patent Number: 5,564,105
[45] Date of Patent: Oct. 8, 1996

[54] METHOD OF TREATING A CONTAMINATED AQUEOUS SOLUTION

[75] Inventors: William M. Alvino, Indiana Township; David C. Grant, Gibsonia; Edward J. Lahoda, Edgewood Borough; William A. Byers, Penn Hills Township; Robert D. Burack, Pleasant Hills, all of Pa.

[73] Assignee: Westinghouse Electric Corporation, Pittsburgh, Pa.

[21] Appl. No.: 446,154

[22] Filed: May 22, 1995

[51] Int. Cl.$^6$ ........................................ G21F 9/00
[52] U.S. Cl. .................. 588/20; 210/711; 210/758; 210/759; 210/760; 976/DIG. 380
[58] Field of Search ..................... 588/20; 210/702, 210/758, 759, 760, 711, 712; 976/DIG. 380

[56] References Cited

U.S. PATENT DOCUMENTS

| | | | |
|---|---|---|---|
| 3,895,465 | 7/1975 | Korn et al. | 51/320 |
| 4,226,640 | 10/1980 | Bertholdt | 134/3 |
| 4,508,641 | 4/1985 | Hanulik | 252/626 |
| 4,512,921 | 4/1985 | Anstine et al. | 252/626 |
| 4,693,833 | 9/1987 | Toshikuni et al. | 210/759 |
| 5,122,268 | 6/1992 | Burack et al. | 210/202 |
| 5,386,078 | 1/1995 | Hanulik | 588/18 |

FOREIGN PATENT DOCUMENTS

| | | | |
|---|---|---|---|
| 61-148398 | 2/1986 | Japan | G21F 9/30 |
| 534498 | 2/1993 | Japan | G21F 9/28 |

OTHER PUBLICATIONS

M. E. Pick and M. G. Segal, "Chemical decontamination of water reactors. CEGB developments and the international scene", *Nucl. Energy*, vol. 22, No. 6 (Dec. 1983), pp. 433–444.

*Primary Examiner*—Ngoclan Mai

[57] ABSTRACT

A borated aqueous solution from a nuclear reactor coolant system dilute chemical-decontamination process or from an equipment washing process which has been contaminated with radioactive metals or heavy metals including cobalt, nickel, chromium, iron, manganese, lead or mercury and with a chelating agent, detergent or soap is treated with an oxidizing agent to oxidize the chelating agent, detergent or soap and to precipitate the contaminant metals. The contaminant metals are then separated from the solution by centrifugal filtration, micromembrane belt filtration or magnetic separation. Advantageously, a very small volume of precipitate may then be buried and the decontaminated solution may be recycled or further treated and released for other uses.

8 Claims, 1 Drawing Sheet

METHOD OF TREATING A CONTAMINATED AQUEOUS SOLUTION

BACKGROUND OF THE INVENTION

The invention relates to a method of treating a contaminated aqueous solution and more particularly to a method of treating an aqueous solution contaminated with cations.

Industrial facilities and equipment contaminated with radioactive metals such as cobalt-58 and cobalt-60 or with heavy metals such as mercury and lead and the like generally are cleaned before they are to be maintained or decommissioned. Typically, an aqueous solution containing a carboxylic complexing agent such as a chelating agent, soap or detergent is circulated through the equipment to solubilize and transport the contaminants from the equipment. See, for example, M. E. Pick et al., "Chemical Decontamination Of Water Reactors. CEGB Developments And The International Scene", Nuclear Energy, 1983, 22, No. 6, December, pages 433–444, which discusses CAN-DECON, LOMI and other dilute chemical decontamination processes that have been employed to decontaminate water cooled reactor facilities or components.

The contaminants in the aqueous cleaning solution must then be immobilized before the water can be released to the environment and the metals can be buried at a permanent disposal site. Thus, the metal contaminants may be adsorbed on ion exchange resins or activated carbon beds and then buried. In other cases, the metals may be precipitated from the solution with precipitating agents and filter aids and then the metals buried together with the precipitating agents and filter aids.

A relatively small amount of waste generates a relatively large volume of waste which is very costly to bury. For example, at least about 40 liters of solid waste volume will be generated by the treatment of only 1000 gallons of water contaminated with 1000 parts per million (ppm) of metal cations with an ion exchange resin or activated carbon. The use of precipitating agents may generate less volume, but no less than about 20 liters. In addition, nuclear wastes may need to be stored onsite in interim storage facilities for long periods of time until a burial site becomes available. For hazardous wastes, a "land ban" on waste disposal has required that ion exchange resins and activated carbon containing hazardous wastes be first treated at costs of from about $300 to about $2,000 per ton before disposal.

SUMMARY OF THE INVENTION

It is an object of the present invention to generate smaller volumes of solid waste in the treatment of contaminated aqueous solutions. It is a further object to more economically treat the contaminated aqueous solutions.

With these objects in view, the present invention resides in a method of treating an aqueous solution containing a cation contaminant complexed by an organic complexing agent by first adding an oxidizing agent to an aqueous solution to oxidize the complexing agent (and thereby to destroy the complex ion) and then separating the free cation from the solution. The complexing agent may be an acid or a salt thereof. In a preferred practice of the present invention, an oxidizing agent such as hydrogen peroxide is added to an aqueous solution containing ferrous and/or ferric cations and other cationic contaminants complexed by a chelating agent such as oxalic acid, citric acid, ethylenediaminetetraacetic acid (EDTA), vanadous formate or formic acid to oxidize the chelating agent and thereby destroy the complex ion. The iron and other cationic contaminants then precipitate from the aqueous solution.

The invention as set forth in the claims and other objects, advantages and benefits thereof will become more apparent from the following detailed description of certain preferred practices thereof.

DESCRIPTION OF THE PREFERRED PRACTICES

In a preferred practice of the present invention, a radioactive aqueous waste solution is generated in the course of decontaminating the reactor coolant system of a pressurized water reactor by a LOMI process, a CAN-DECON process or a CAN-DEREM process, which is a CAN-DECON improvement that does not employ oxalic acid. The above-mentioned M. E. Pick et al. paper from Nuclear Energy is hereby incorporated by reference for its discussion of these processes and various permanganate oxidation processes which may be employed in alternating steps to decontaminate entire reactor coolant systems or their components. In these decontamination processes, an aqueous solution at about 180° F. to about 210° F. or more and containing a cation-complexing agent is circulated throughout the system to dissolve iron and other metals in radioactive oxide films on the wetted surfaces of vessels, pipes, pumps and the like. Thus, the aqueous solution will contain up to about 1000 ppm or more of one or more carboxylic acids such EDTA, hydroethylenediamine-tetraacetic acid (HEDTA), nitrilotriacetic acid (NTA), oxalic acid, citric acid, picolinic acid, or formic acid or salts thereof. As the aqueous solution circulates through the system, it becomes contaminated with complexes of iron ($Fe^{+2}$ and/or $Fe^{+3}$), cobalt ($Co^{+2}$), nickel ($Ni^{+2}$ and/or $Ni^{+3}$), chromium ($Cr^{+3}$ and/or $Cr^{+6}$), manganese ($Mn^{+2}$) or other metals from the surface oxides.

In the preferred practice of the present invention in the course of decontaminating a nuclear facility, an aqueous solution containing less than about one percent by weight of a carboxylic complexing agent contaminated principally by iron, cobalt and nickel as well as other cations, is pumped out of the reactor coolant system after the solution has circulated throughout the system for up to about thirty minutes to an hour or longer. An oxidizing agent is then added to the contaminated solution to oxidize the complexing agent and thereby to destroy the complex. Accordingly, ozone, hydrogen peroxide or a chlorite solution may be added to the contaminated solution, which reacts with the complexing acid to form carbon dioxide and water. This oxidation step may be enhanced with ultraviolet light. The temperature of the solution is preferably maintained from about 140° F. to about 212° F. Advantageously, the cations tend to precipitate and may then be separated from the solution. Iron may also be magnetically separated from the solution. Centrifugal filtration or micromembrane belt filtration may be employed to separate the cations. The small volume of precipitate may then be buried. The water may be reused or further treated and released for other uses.

Figure 1:
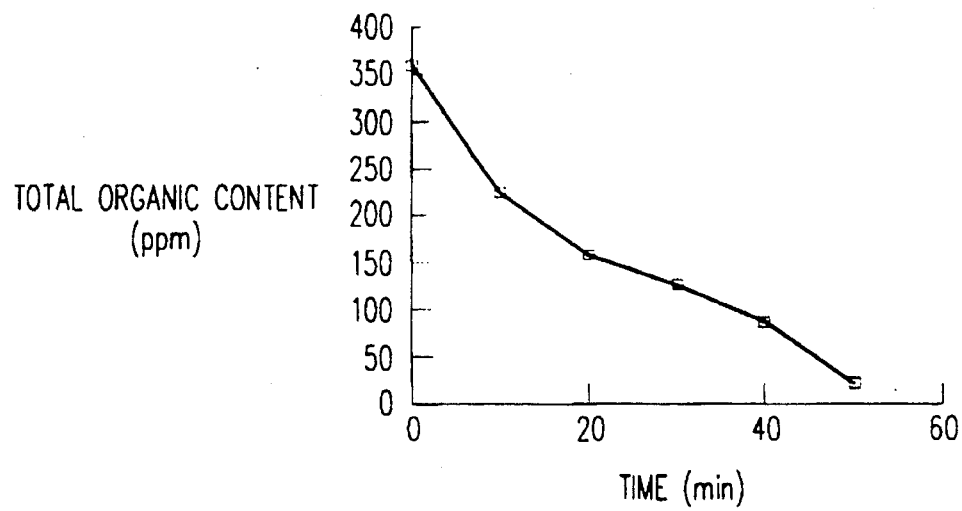
FIG. 1 graphically presents test results of a first preferred practice of the present invention in combination with a simulated contaminated CAN-DEREM solution.

The present invention was demonstrated by fifteen gallon batch tests performed on surrogate contaminated, CAN-DECON/CAN-DEREM and LOMI solutions from simulated pressurized water nuclear reactor coolant system decontamination processes. In a first test, a contaminated CAN-DECON/CAN-DEREM solution was simulated by an aqueous solution containing 1000 ppm of a well known London Nuclear Company decontaminant agent known as LND 107 (which comprises about 60% EDTA and 40% citric acid with 360 ppm Total Organic Carbon ([TOC]), 650 ppm boron, 113 ppm $Fe^{+2}$, 21.5 ppm $Ni^{+2}$ and 1.27 ppm $Co^{+2}$. The boron is employed in pressurized water reactor coolant systems as a moderator. The temperature of the solution was maintained at about 180° F. and hydrogen peroxide was added in three additions over a period of about 50 minutes. At the end of this test, the solution contained about 3.5% hydrogen peroxide and 0.03 ppm Fe. The cobalt and nickel concentrations were not determined and would, if necessary in a commercial facility, be reduced by pH control. The iron from the destroyed ion complexes precipitated from the solution. FIG. 1 shows that the TOC of the solution was reduced from 360 ppm to less than about 50 ppm in about 50 minutes.

Figure 2:
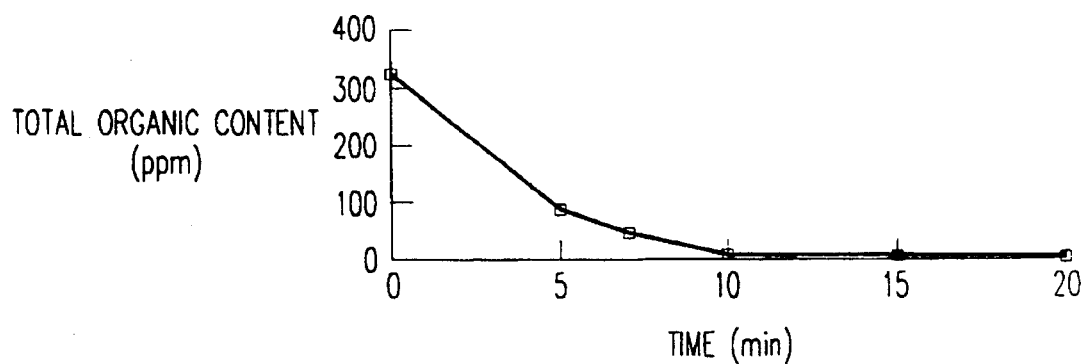
FIG. 2 graphically presents test results of a second preferred practice of the present invention in combination with a simulated contaminated CAN-DEREM solution.

In a second test, a contaminated CAN-DECON/CAN-DEREM solution was simulated by an aqueous solution containing 1000 ppm of decontaminant agent LND 107 (which comprised about 60% EDTA and 40% citric acid with 360 ppm TOC), 650 ppm boron, 113 ppm $Fe^{+2}$, 21.5 ppm $Ni^{+2}$ and 1.27 ppm $Co^{+2}$. Hydrogen peroxide was continuously added to the solution over a period of about 20 minutes. At the end of this test, the solution contained 0.1% hydrogen peroxide and less than 1 ppm $Fe^{+2}$ and had a final pH of 6.6. The cobalt and nickel concentrations were not determined. The iron from the destroyed complexes precipitated from the solution. FIG. 2 shows that the TOC of the solution was reduced from about 300 ppm to a negligible amount in about ten minutes. A comparison of FIGS. 1 and 2 indicates that the continuous addition of the oxidizing agent is more effective in reducing the TOC than is periodic addition of the agent.

Figure 3:
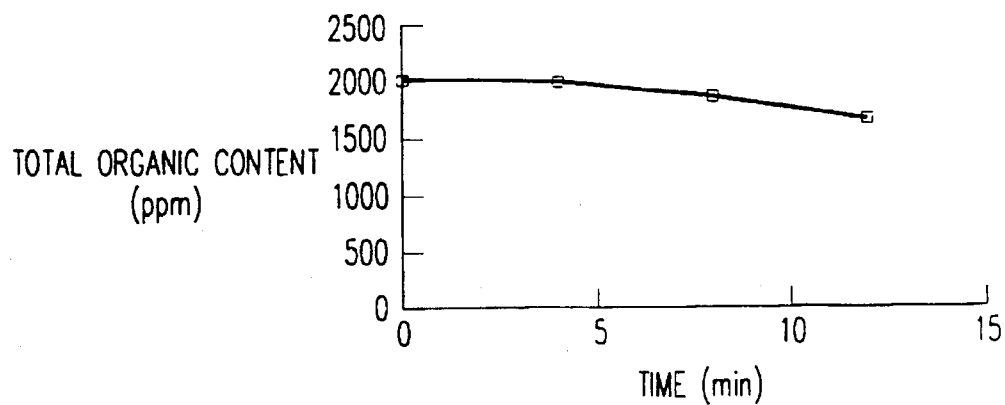
FIG. 3 graphically presents test results of a third preferred practice of the present invention in combination with a simulated contaminated LOMI solution.

In a third test, a contaminated LOMI solution was simulated by an aqueous solution containing 32 ml vanadous formate/liter solution, 103 ppm $Fe^{+2}$, 60 ppm $Ni^{+2}$ and 2.3 ppm $Co^{+2}$. The initial TOC was 2040 ppm and the pH was 4.7. Initially, ultraviolet light was employed to oxidize the formate ions and the hydrogen peroxide concentration of the contaminated solution was less than about 0.25%. FIG. 3 shows that the TOC of the solution was substantially unchanged during this period and substantially no precipitation occurred in this time. Iron precipitation later occurred when the hydrogen peroxide concentration of the solution was raised up to 8%.

The present invention is also useful to concentrate heavy metals such as mercury and lead which are washed from equipment or soil by soap or detergent solutions. The present invention is also useful in similar processes where hazardous substances such as dioxins, furans and polyphenols are emulsified by soap or detergent solutions.

While a present preferred embodiment of the present invention has been shown and described, it is to be understood that the invention may be otherwise variously embodied within the scope of the following claims of invention.

We claim:

1. A method of treating a contaminated aqueous solution, characterized by the steps of:

pumping a borated aqueous solution out of a reactor coolant system, the solution containing ionic complexes comprised of a ferrous cation contaminant and an organic complexing agent;

adding an oxidizing agent to the borated aqueous solution to oxidize the complexing agent and thereby to destroy the complex and precipitate the contaminant to produce a borated aqueous solution contaminated with less than 1 ppm ferrous cation;

separating the precipitated contaminant from the solution; and then reusing the borated aqueous solution.

2. The method of claim 1, wherein the complexing agent is a dicarboxylic acid or a salt thereof.

3. The method of claim 2, wherein the complexing agent is selected from the group consisting of oxalic acid, citric acid, picolinic acid, nitrilotriacetic acid, ethylenediaminetetraaceticacid, hydroethylenediaminetetraacetic acid and salts thereof.

4. The method of claim 1, wherein the complexing agent is vanadous formate or formic acid.

5. The method of claim 1, wherein the complexing agent is a soap or a detergent.

6. The method of claim 1, wherein the oxidizing agent is selected from the group consisting of $O_3$, and $H_2O_2$.

7. The method of claim 1, wherein the oxidizing agent is $H_2O_2$, and wherein the oxidizing agent is added to the contaminated aqueous solution to reduce its Total Organic Carbon from about 360 ppm to less than about 50 ppm in no more than 50 minutes.

8. The method of claim 1, wherein the oxidizing agent is continuously added to the borated aqueous solution.

* * * * *